UNITED STATES PATENT OFFICE.

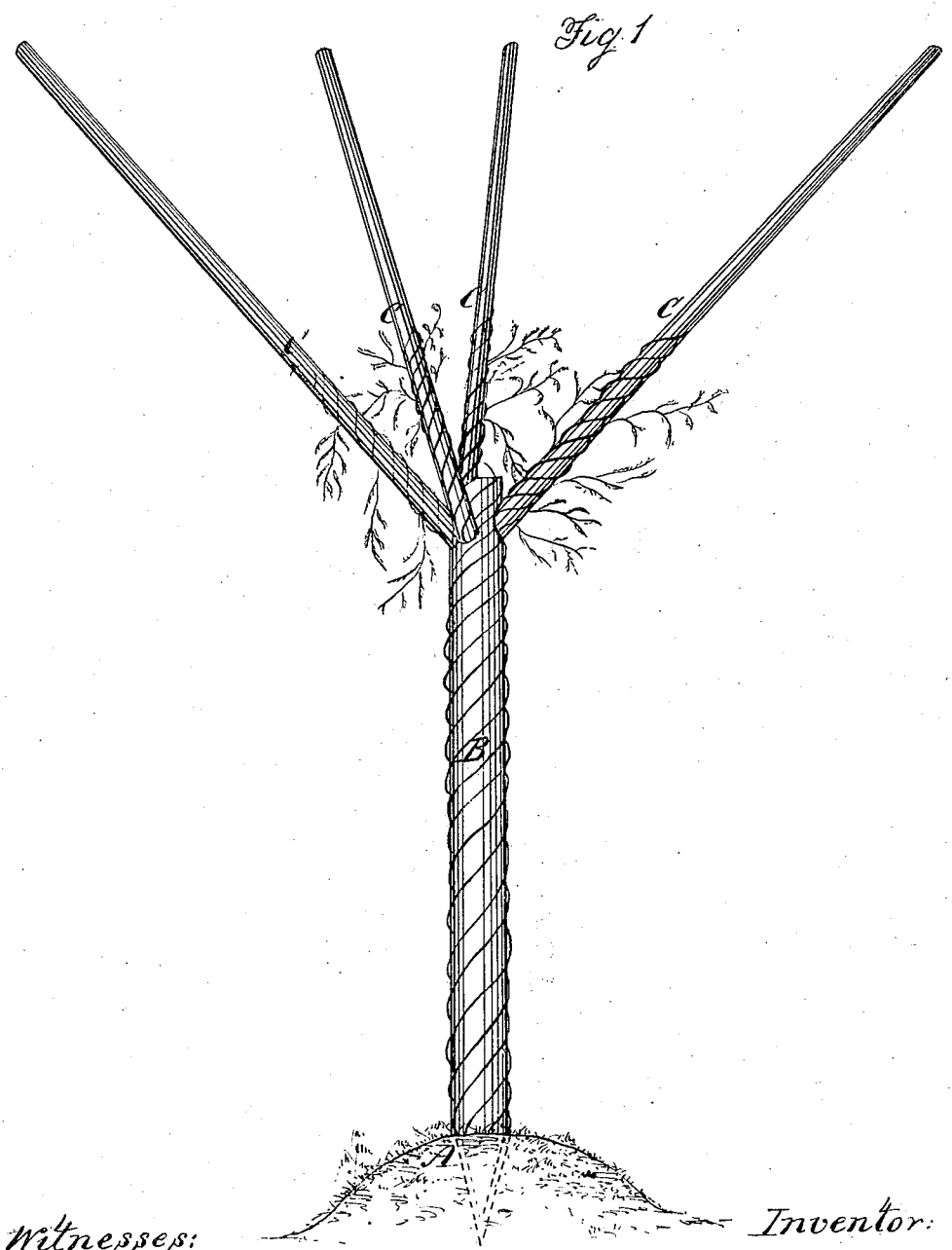

WILLIAM C. DUNN, OF GREENE, NEW YORK.

IMPROVEMENT IN TRAINING HOPS.

Specification forming part of Letters Patent No. 59,197, dated October 30, 1866.

*To all whom it may concern:*

Be it known that I, WILLIAM C. DUNN, of the town of Greene, Chenango county, State of New York, have invented a new and improved Mode of Training or Poling Hops; and I do hereby declare that the following is a full and exact description thereof, reference being had to the accompanying drawings, and to the letters marked thereon.

The nature of my invention consists in making the pole or support for the hops of a main post of about six feet in height, with arms or small poles set at an angle of about forty-five degrees projecting from each quarter of the main pole or post.

To enable others skilled in the cultivation of hops to use my invention, I will proceed to describe its construction and operation.

Figure 1 is a full representation of one of my supporters in actual use.

A represents the earth; B, the main post; C C C C, the arms projecting from the top of the post.

I use any kind of timber most convenient to be obtained for the main post, and prefer it should be from four to five inches in diameter, six feet in length, or more. At the small end I bore four holes at an angle of forty-five degrees as near as may be, and so as to divide the surface into quarters. I sharpen the large end of the post so it can be driven into the ground. When the main post is set, I take small poles, and insert them into the holes, and they form a branch head of arms for the bearing portion of the vines to run upon.

I am aware that a plan has been devised to set a post similar to my main post, and then putting on branching out horizontally, to which strings are attached to train the vines; but I find on a trial that when the arms run horizontally the vines will not wind themselves upon the arms, but have to be put around the arm by hand, causing an immense amount of labor to tend a large yard, and the vine gets much injured by the handling, which often causes a partial failure of the crop.

I find by using my method that the vines will readily wind around the arms of themselves, and that pendules or bunches of hops hang free from the pole or arm, as seen at *h h.* The leaves also incline upward far better than by any other mode of training I have seen used, and form a shelter to the hops both from the sun and storm.

It is well known to hop-growers that no hops grow nearer to the ground than five to six feet on the ordinary poles, and that when the time comes to gather the crop it is a great trouble to handle and dispose of the poles; but by my method this trouble is much relieved, for by cutting the vines at the intersection of the arm to the post, it is easy to remove the arm and place it in a convenient position for the pickers; and after the hops are harvested the poles, being small, are easily gathered and stored for further use at a much less cost than by any other mode.

I also deem that it is an advantage to use my invention; that the growing crop on the arms forms a complete shade to the lower part of the vines and also the ground, which will in a great measure prevent the bad effects of drought.

I also do not confine myself to the number of arms used at four, but may use a less or greater number; nor to the exact angle of forty-five degrees for the arms; but from my experience I think the number and angle named are the best for setting and properly arranging a hop-field.

Having thus fully stated what my invention and its construction and use is, what I claim as my invention, and desire Letters Patent for, is—

The construction and use of a hop-trainer, constructed and used substantially as described.

Dated at Greene, July 24, 1866.

WILLIAM C. DUNN.

Witnesses:
 N. W. NORTHRUP,
 R. MACDONALD.